US012451532B2

(12) United States Patent
Hou et al.

(10) Patent No.: US 12,451,532 B2
(45) Date of Patent: Oct. 21, 2025

(54) BATTERY MODULE AND DEVICE

(71) Applicant: CONTEMPORARY AMPEREX TECHNOLOGY (HONG KONG) LIMITED, Hong Kong (CN)

(72) Inventors: Yujia Hou, Ningde (CN); Xuguang Wang, Ningde (CN); Lilei Su, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 601 days.

(21) Appl. No.: 17/745,751

(22) Filed: May 16, 2022

(65) Prior Publication Data
US 2022/0278383 A1 Sep. 1, 2022

Related U.S. Application Data

(63) Continuation of application No. PCT/CN2020/124968, filed on Oct. 29, 2020.

(30) Foreign Application Priority Data

Nov. 22, 2019 (CN) .......................... 201922029742.8

(51) Int. Cl.
H01M 10/48 (2006.01)
H01M 10/42 (2006.01)

(52) U.S. Cl.
CPC ....... *H01M 10/486* (2013.01); *H01M 10/425* (2013.01)

(58) Field of Classification Search
CPC ............. H01M 10/486; H01M 10/425; H01M 10/637; H01M 10/42; H01M 10/46;
(Continued)

(56) References Cited

U.S. PATENT DOCUMENTS 9,450,226 B2 * 9/2016 Morgan .............. H01M 10/486
2007/0122696 A1 * 5/2007 Richter .............. H01M 50/561
429/180
(Continued)

FOREIGN PATENT DOCUMENTS

CN 207779574 U * 8/2018
CN 109148993 A 1/2019
(Continued)

OTHER PUBLICATIONS

CN207779574U translation (Year: 2018).*
(Continued)

Primary Examiner — Helen Oi K Conley
Assistant Examiner — Amanda Rosenbaum
(74) Attorney, Agent, or Firm — K&L Gates LLP

(57) ABSTRACT

This application provides a battery module and a device, and relates to the technical field of batteries. The battery module includes a battery cell, a circuit board, a temperature sensor, and a fixing component. The circuit board is disposed at a top of the battery cell and electrically connected to the battery cell. The temperature sensor is disposed at the top of the battery cell and configured to measure a temperature of the battery cell. The temperature sensor is electrically connected to the circuit board. The fixing component includes a fixing portion and a rotation portion. The fixing portion is fixed to the top of the battery cell. The rotation portion is screwed into the fixing portion so that the temperature sensor is pressed against the battery cell tightly. This application can improve accuracy of temperature collection of the battery cell.

8 Claims, 6 Drawing Sheets

(58) Field of Classification Search
CPC ............ H01M 10/48; H01M 50/0519; H01M 50/569; H01M 50/59; H01M 50/591; H01M 2200/00; H01M 2200/10; H05K 1/00; H05K 1/0201; H05K 1/0204; H05K 1/021

See application file for complete search history.

(56) References Cited

U.S. PATENT DOCUMENTS

| | | |
|---|---|---|
| 2011/0269008 A1 | 11/2011 | Houchin-Miller et al. |
| 2014/0017533 A1* | 1/2014 | Nishihara ............ H01M 50/569 429/93 |
| 2014/0093755 A1 | 4/2014 | Houchin-Miller et al. |
| 2015/0023392 A1 | 1/2015 | Noh |
| 2015/0079437 A1 | 3/2015 | Jeong et al. |
| 2020/0328398 A1* | 10/2020 | Wiegmann ............ H01M 50/561 |

FOREIGN PATENT DOCUMENTS

| | | |
|---|---|---|
| CN | 208674189 U | 3/2019 |
| CN | 210744090 U | 6/2020 |
| JP | 2008251470 A | 10/2008 |

OTHER PUBLICATIONS

Contemporary Amperex Technology Co., Limited, International Search Report and Written Opinion, PCT/CN2020124968, Jan. 27, 2021, 15 pgs.

Contemporary Amperex Technology Co., Limited, Extended European Search Report, EP20890175.1, Jul. 29, 2022, 6 pgs.

* cited by examiner

BATTERY MODULE AND DEVICE

CROSS-REFERENCE TO RELATED APPLICATIONS

This application is a continuation application of PCT Patent Application No. PCT/CN2020/124968, entitled "BATTERY MODULE AND DEVICE" filed on Oct. 29, 2020, which claims priority to Chinese Patent Application No. 201922029742.8, filed with the State Intellectual Property Office of the People's Republic of China on Nov. 22, 2019, and entitled "BATTERY MODULE AND DEVICE", all of which are incorporated herein by reference in their entirety.

TECHNICAL FIELD

This application relates to the technical field of batteries, and in particular, to a battery module and a device.

BACKGROUND

A battery module includes a plurality of battery cells. The plurality of battery cells are electrically connected to each other in parallel and/or in series. During operation of the battery module, the battery cells contained in the battery module heat up. Operating status of a battery cell can be grasped and understood through monitoring on a temperature of the battery cell.

In some circumstances, a temperature sensor is connected onto a connecting plate through a metal sheet, and a temperature of the connecting plate is used as the temperature of the battery cell. However, in many circumstances, the temperature of the connecting plate differs sharply from the temperature of the battery cell, so that the operating status of the battery cell is not accurately grasped or understood.

SUMMARY

This application provides a battery module and a device to improve accuracy of temperature collection of a battery cell.

A first aspect of this application provides a battery module, including: a battery cell; a circuit board, disposed at a top of the battery cell and electrically connected to the battery cell; a temperature sensor, disposed at the top of the battery cell and configured to measure a temperature of the battery cell, where the temperature sensor is electrically connected to the circuit board; and a fixing component, where the fixing component includes a fixing portion and a rotation portion, the fixing portion is fixed to the top of the battery cell, and the rotation portion is screwed into the fixing portion so that the temperature sensor is pressed against the battery cell tightly.

In this embodiment, the fixing portion is fixed onto the top of the battery cell, and the rotation portion is screwed into the fixing portion and is pressed against the temperature sensor tightly. In this way, the temperature sensor is forced to fit snugly with the battery cell, and the temperature sensor directly collects the temperature of the battery cell, thereby improving accuracy of temperature collection of the battery cell.

In some embodiments, the fixing portion includes an inner cavity. The inner cavity runs through to the top of the battery cell. The temperature sensor is accommodated in the inner cavity. A mating slot is disposed on a side wall of the inner cavity, and the rotation portion is screwed into the fixing portion along the mating slot.

In this embodiment, the temperature sensor is accommodated in the inner cavity to protect the temperature sensor, so as to prevent the temperature sensor from colliding with or being scratched by other parts, and prevent the precision of the temperature sensor from being affected.

In addition, a mating slot is disposed on the side wall of the inner cavity, so as to screw the rotation portion into the fixing portion steadily and prevent tilting in a process of screwing the rotation portion into the fixing portion. In this way, a steady and even pressing force is exerted by the rotation portion on the temperature sensor.

In some embodiments, the rotation portion includes a spindle. A bulge is disposed on the side wall of the spindle. The bulge is screwed into the fixing portion along the mating slot.

In this embodiment, the bulge is screwed into the fixing portion along the mating slot, and a contact area between the rotation portion and the mating slot is reduced. In this way, a friction resistance between the rotation portion and the mating slot is reduced, and the rotation portion can be screwed into the fixing portion more easily.

In some embodiments, the quantity of bulges is two, and the two bulges are symmetrically disposed on two sides of the spindle.

In this embodiment, the two bulges are screwed into the fixing portion from two sides along the corresponding mating slot respectively. In this way, the rotation portion can be screwed into the fixing portion more steadily, tilting is avoided in the process of screwing the rotation portion into the fixing portion, and a steady and even pressing force is exerted by the rotation portion on the temperature sensor.

In some embodiments, a notch is disposed on an inner side wall of mating slot. The notch extends in a direction away from battery cell, and the bulge is located in the notch.

In this embodiment, the design of the notch can prevent the rotation portion from automatically reversely rotating during operation under an impact such as vibration, prevent the rotation portion from loosening, and improve the reliability of connection between the temperature sensor and the battery cell.

In some embodiments, a positioning aperture is disposed on the mating slot. The positioning aperture is disposed at an end of the mating slot, the end being away from the battery cell. The positioning aperture extends to the outside of the fixing portion.

In this embodiment, along an axial direction of the fixing portion, the positioning aperture extends to an end of the fixing portion, the end being away from the battery cell. In this way, the rotation portion slides from the positioning aperture into the mating slot along a vertical direction (a direction parallel to an axis of the fixing portion). The rotation portion can be automatically slid into the mating slot under the action of its own gravity, friction between the rotation portion and the positioning aperture is avoided, and the mounting of the rotation portion is more labor-saving.

In some embodiments, the fixing portion includes a first fastener and a second fastener. The first fastener and the second fastener define an inner cavity.

In this embodiment, through the design of the first fastener and the second fastener, structures and shapes of the fixing portion are more flexible and adaptable, so that the fixing portion can adapt to the top of the battery cell.

In some embodiments, the mating slot includes two mating slot sections. The two mating slot sections are disposed on the first fastener and the second fastener respectively. The two mating slot sections are disposed centrosymmetrically.

In this embodiment, the two mating slots disposed centrosymmetrically enable the first fastener and the second fastener to screw into the mating slot from two sides along the corresponding mating slot section respectively. In this way, the rotation portion can be screwed into the fixing portion more steadily, tilting is avoided in the process of screwing the rotation portion into the fixing portion, and a steady and even pressing force is exerted by the rotation portion on the temperature sensor.

In some embodiments, a gap is disposed between the first fastener and the second fastener, and a part of the circuit board passes through the gap.

In this embodiment, the circuit board is avoided through the gap. Therefore, the fixing portion is prevented from obstructing an extension path of the circuit board, and the gap can limit a position of the circuit board and prevent the circuit board from moving.

In some embodiments, the battery module further includes a thermally conductive piece. The thermally conductive piece is disposed between the temperature sensor and the battery cell.

In this embodiment, the reliability of contact between the temperature sensor and the battery cell can be improved by the thermally conductive piece.

In some embodiments, the battery module further includes an elastic gasket. The elastic gasket is disposed between the rotation portion and the temperature sensor.

In this embodiment, the elastic gasket is disposed between the rotation portion and the temperature sensor to form elastic contact between the rotation portion and the temperature sensor, so as to prevent the rotation portion from exerting an excessive pressing force on the temperature sensor and damaging the temperature sensor.

In some embodiments, the battery module further includes a wiring harness separator. The wiring harness separator is fixed to the top of the battery cell. The fixing portion is disposed on the wiring harness separator.

In this embodiment, the wiring harness separator is fixed on the top of the battery cell, thereby facilitating arrangement and mounting of other parts on the top of the battery cell and simplifying the assembly of the battery module.

A second aspect of this application provides a device. The device includes any battery module provided in this application. The battery module is configured to provide electrical energy.

The device according to this embodiment includes the battery module, and therefore, possesses the advantages of the battery module. To be specific, the fixing portion is fixed onto the top of the battery cell, and the rotation portion is screwed into the fixing portion and is pressed against the temperature sensor tightly. In this way, the temperature sensor is forced to fit snugly with the battery cell, and the temperature sensor directly collects the temperature of the battery cell, thereby improving accuracy of temperature collection of the battery cell.

Understandably, the above general description and the following detailed description are merely exemplary without limiting this application.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

Figure 1:
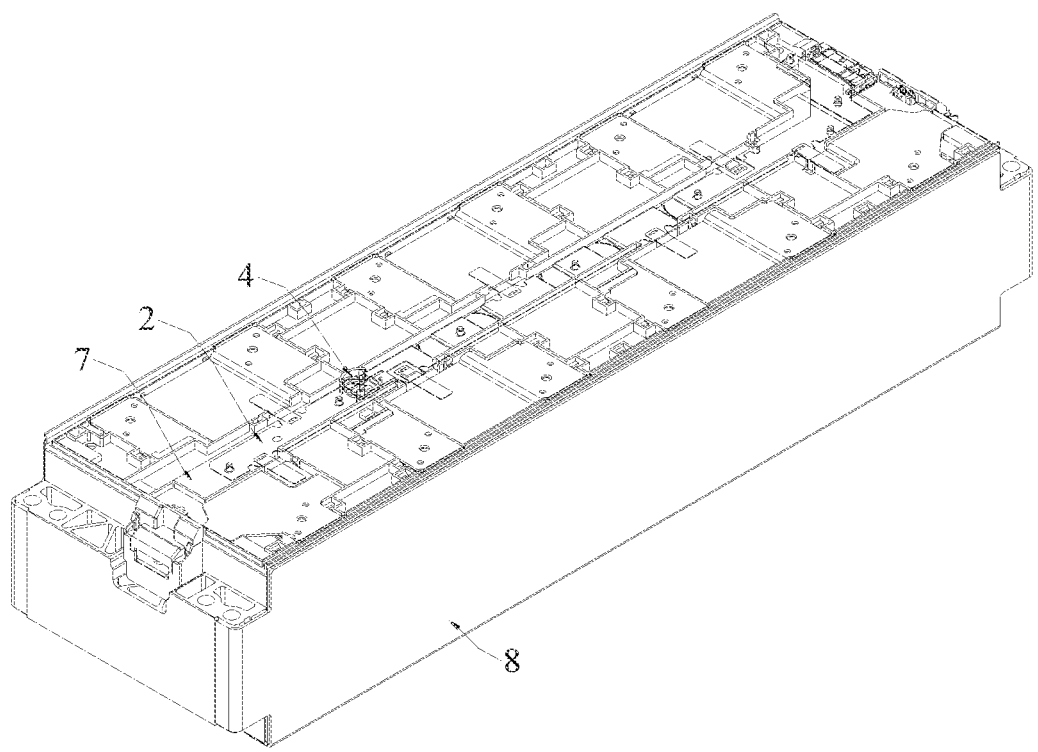
FIG. 1 is a schematic structural diagram of a battery module containing no upper cover according to an embodiment of this application.

The drawings are not drawn to scale.

REFERENCE NUMERALS

1—Battery cell; 10—Baffle plate; 2—Circuit board; 20—Groove; 22—Cantilever structure; 3—Thermally conductive piece; 4—Fixing component; 40—Fixing portion; 400—Inner cavity; 402—Mating slot; 402a—Mating slot section; 404—Positioning aperture; 406—Notch; 40a—First fastener; 40b—Second fastener; 40c—Gap; 42—Rotation portion; 420—Spindle; 422—Bulge; 5—Temperature sensor; 6—Elastic gasket; 7—Wiring harness separator; 8—Housing; 80—End plate; 82—Side plate; 84—Insulation plate; 9—Upper cover.

The drawings described here are incorporated into the specification as a part of the specification. The drawings illustrate embodiments of this application and are used together with the specification to interpret the principles of this application.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

As shown in FIG. 1 to FIG. 8, an embodiment of this application provides a device and a battery module. The battery module is configured to provide electrical energy for the device. The device may be an energy storage device such as an energy storage cabinet, or may be a mobile device such as a vehicle, a ship, or a small aircraft. When the device is a mobile device, the device includes a driving component. The driving component is configured to provide a driving force to the device. The driving component may be configured as a battery module that provides electrical energy to a power source. The driving force of the device may be sole electrical energy, or may include electrical energy and other types of energy (such as mechanical energy). The driving component may be a battery module (or a battery pack or a battery cell 1), and the driving component may also be a combination of a battery module (or a battery pack or a battery cell 1) and an engine, or the like. Therefore, all devices that can use a battery module as a power supply fall within the protection scope of this application.

Using a vehicle as an example, a vehicle according to an embodiment of this application may be a new energy vehicle. The new energy vehicle may be a battery electric vehicle, or may be a hybrid electric vehicle, a range-extended electric vehicle, or the like. The vehicle may include a battery module and a vehicle body. The battery module is disposed in the vehicle body. A driving motor is further disposed in the vehicle body, and the driving motor is electrically connected to the battery module and is powered by the battery module. The driving motor is connected to wheels of the vehicle body through a transmission mechanism to drive the vehicle to run. The battery module may be horizontally disposed at a bottom of the vehicle body.

Figure 2:
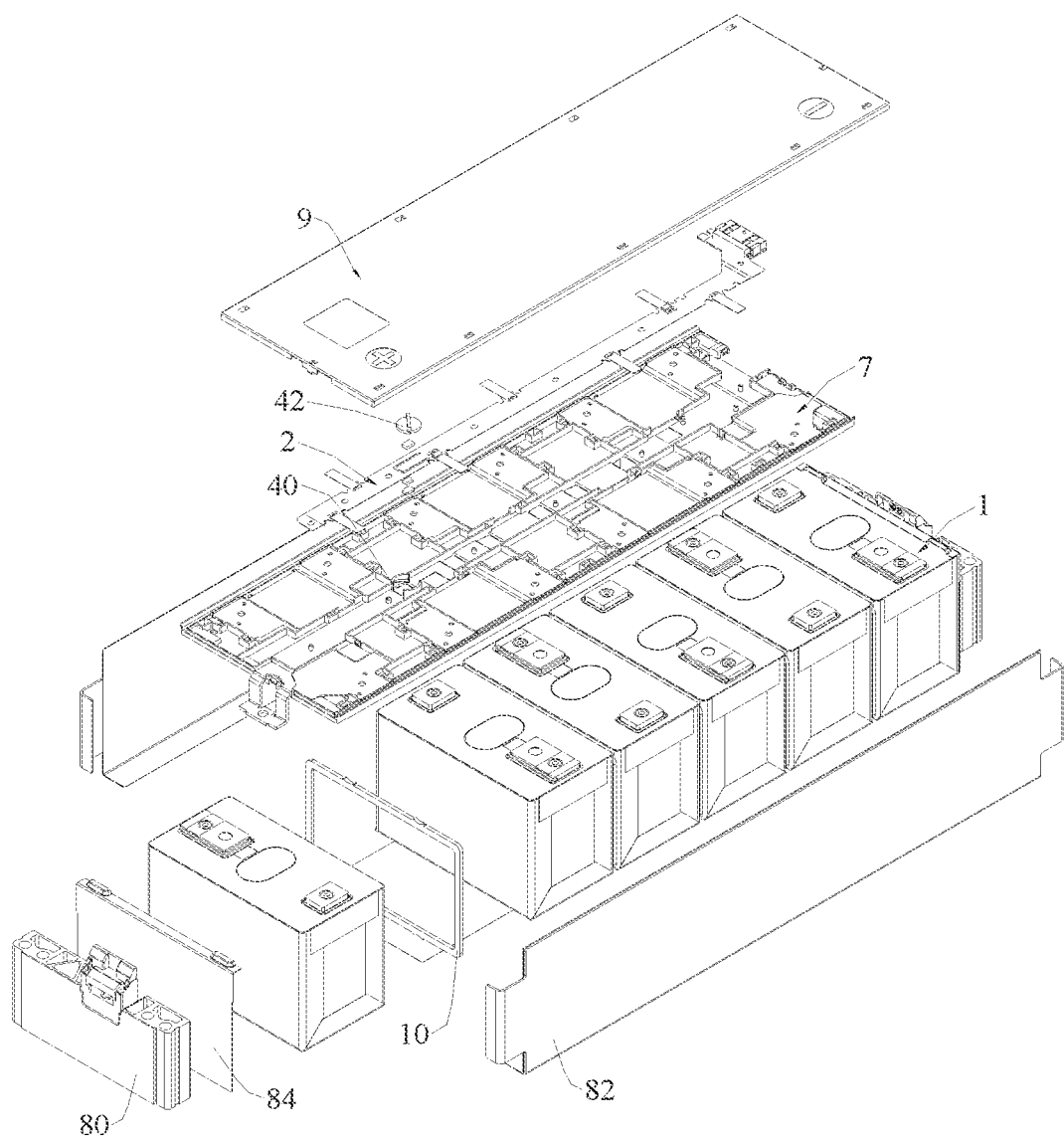
FIG. 2 is an exploded structural view of a battery module according to an embodiment of this application.
Figure 3:
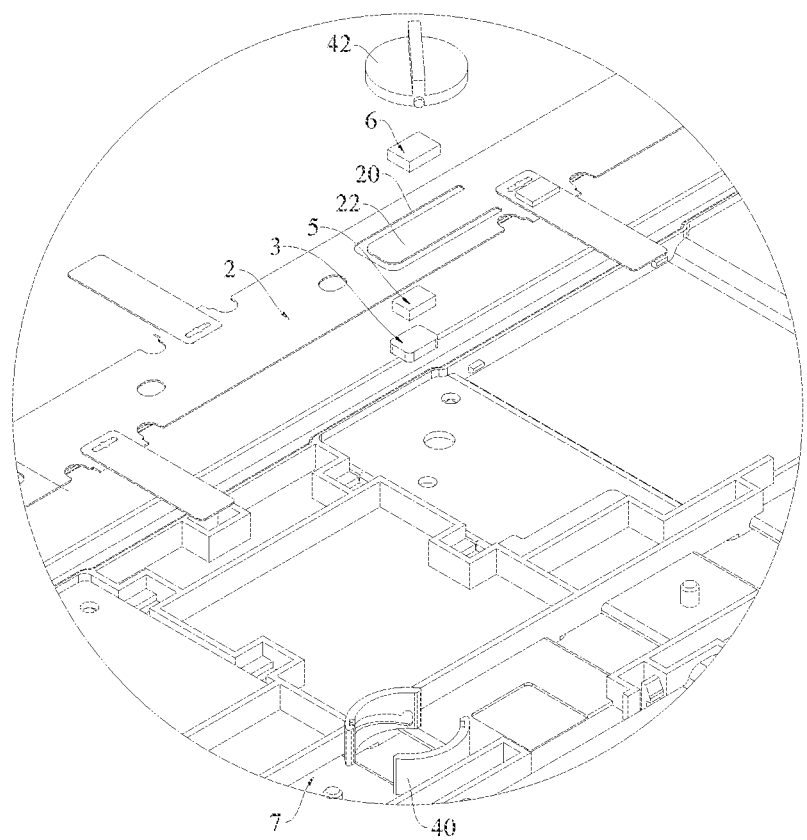
FIG. 3 is a local detailed view of FIG. 2.

As shown in FIG. 1 to FIG. 3, a battery module provided in an embodiment of this application includes a plurality of battery cells 1, a housing 8, and an upper cover 9. The plurality of battery cells 1 are electrically connected to each other in parallel and/or in series. A baffle plate 10 may be disposed between adjacent battery cells 1. The baffle plate 10 may provide a heat insulation function, such as an aerogel heat insulation pad. Alternatively, the baffle plate 10 may provide a buffer function, such as a rubber pad. The housing 8 includes an opening. The plurality of battery cells 1 are arranged sequentially and accommodated in the housing 8. The battery cells 1 are fixed and protected by the housing 8. An insulation plate 84 may be disposed between the housing 8 and the battery cells 1. The upper cover 9 covers the opening of the housing 8 to enclose the battery cells 1 in the housing 8.

As shown in FIG. 2, the plurality of battery cells 1 are sequentially arranged in a rectangular shape. The housing 8 includes two end plates 80 and two side plates 82. The end plates 80 and the side plates 82 are connected to each other to form a rectangular frame that encloses the battery cells 1. Nevertheless, the plurality of battery cells 1 may also be arranged in other shapes, and accordingly, the housing 8 may be configured in other corresponding shapes.

In some embodiments, the battery module further includes a circuit board 2, a temperature sensor 5, and a fixing component 4. The circuit board 2 is disposed at the top of the battery cells 1 and electrically connected to the battery cells 1, and is configured to collect signals such as voltage and temperature of each battery cell 1, so as to grasp and understand operating status of the battery cell 1. The temperature sensor 5 is disposed at the top of the battery cells 1 and electrically connected to the circuit board 2, and is configured to measure the temperature of each battery cell 1 and transmit a temperature signal to the circuit board 2. The fixing component 4 is disposed at the top of the battery cells 1, and is configured to exert a force on the temperature sensor 5. In this way, the temperature sensor 5 is pressed against the battery cell 1 tightly, and the temperature sensor 5 is forced to fit snugly with the battery cell 1. Therefore, the temperature sensor 5 directly collects the temperature of the battery cell 1, thereby improving accuracy of temperature collection of the battery cell 1.

In some embodiments, the temperature sensor 5 may be welded to the circuit board 2 to simplify assembly of the battery module. The temperature sensor 5 may be directly connected to a main part of the circuit board 2, or may be connected to a tributary part configured on the circuit board 2. The fixing component 4 presses the temperature sensor 5 by pressing the circuit board 2.

Figure 4:
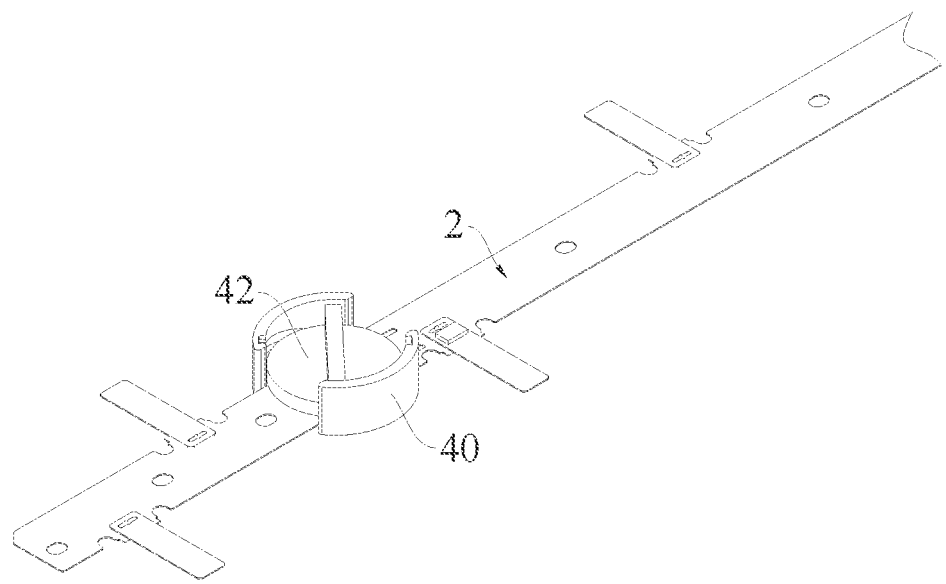
FIG. 4 is a schematic structural diagram of coordination between a circuit board and a fixing component according to an embodiment of this application.

As shown in FIG. 4, when the temperature sensor 5 is directly connected to the main part of the circuit board 2, a groove 20 may be disposed on the circuit board 2. The groove 20 is configured in a "C" shape, and the groove 20 runs through the circuit board 2 along a thickness direction of the circuit board 2. In this way, the main part of the circuit board 2 forms a cantilever structure 22. The cantilever structure 22 withstands the pressing force of the fixing component 4. Because the cantilever structure 22 is elastic to some extent, the cantilever structure 22 can be elastically deformed under the pressing force of the fixing component 4, so as to prevent the main part of the circuit board 2 from being damaged such as deformed.

Figure 5:
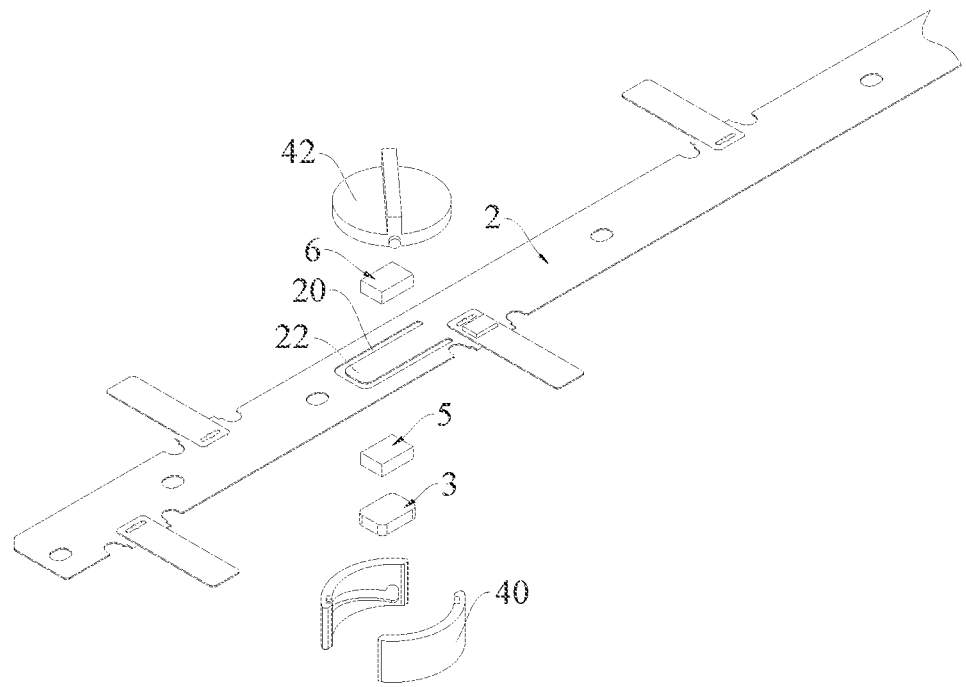
FIG. 5 is a schematic structural exploded view of FIG. 4.

As shown in FIG. 5, the fixing component 4 includes a fixing portion 40 and a rotation portion 42. The fixing portion 40 is fixed onto the top of the battery cell 1 to limit a connection position of the temperature sensor 5 and facilitate precise positioning and accurate mounting of the temperature sensor 5. The rotation portion 42 is screwed into the fixing portion 40. In other words, the rotation portion 42 can rotate against the fixing portion 40. As the rotation portion 42 rotates, the rotation portion 42 can move in a direction close to the battery cell 1. In this way, the rotation portion 42 exerts a pressure on the temperature sensor 5, and the temperature sensor 5 is forced to be pressed against the battery cell 1. The structure is simple, the mounting is convenient, and the assembly of the battery module is simplified.

The fixing portion 40 may be directly fixed onto the battery cell 1. For example, the fixing portion 40 is integrally formed with an upper cover plate of the battery cell 1, or the fixing portion 40 is connected onto the upper cover plate of the battery cell 1 by means of connection such as welding. The fixing portion 40 may also be indirectly fixed onto the battery cell 1. To be specific, the fixing portion 40 may be fixed onto another fixing part (such as a wiring harness separator 7) disposed at the top of the battery cell 1, and the fixing part can be fixed against the battery cell 1.

In some embodiments, the battery module further includes a wiring harness separator 7. The wiring harness separator 7 is fixed onto the top of the battery cell 1, so as to facilitate arrangement and mounting of other parts on the top of the battery cell 1 and simplify the assembly of the battery module. For example, the circuit board 2 may be mounted on the wiring harness separator 7, and then the wiring harness separator 7 is integrally fixed onto the top of the battery cell 1. The fixing portion 40 may be disposed on the wiring harness separator 7 without changing an existing structure of the top of the battery cell 1. In this way, the fixing component 4 is applicable to the battery cells 1 of various structures and shapes, and an application scope of the fixing component 4 is broadened.

In some embodiments, the battery module further includes a thermally conductive piece 3. The thermally conductive piece 3 may be a thermally conductive adhesive or another filler material of high thermal conductivity. The thermal conductive piece 3 is disposed between the temperature sensor 5 and the battery cell 1 to increase the reliability of the contact between the temperature sensor 5 and the battery cell 1.

In some embodiments, the battery module further includes an elastic gasket 6. The elastic gasket 6 is disposed between the rotation portion 42 and the temperature sensor 5 to form elastic contact between the rotation portion 42 and the temperature sensor 5, so as to prevent the rotation portion 42 from exerting an excessive pressing force on the temperature sensor 5 and damaging the temperature sensor 5.

As shown in FIG. 3 to FIG. 8, the fixing portion 40 includes an inner cavity 400. The inner cavity 400 runs through to the top of the battery cell 1. The temperature sensor 5 is accommodated in the inner cavity 400 to protect the temperature sensor 5, so as to prevent the temperature sensor 5 from colliding with or being scratched by other parts, and prevent the precision of the temperature sensor 5 from being affected.

Figure 6:
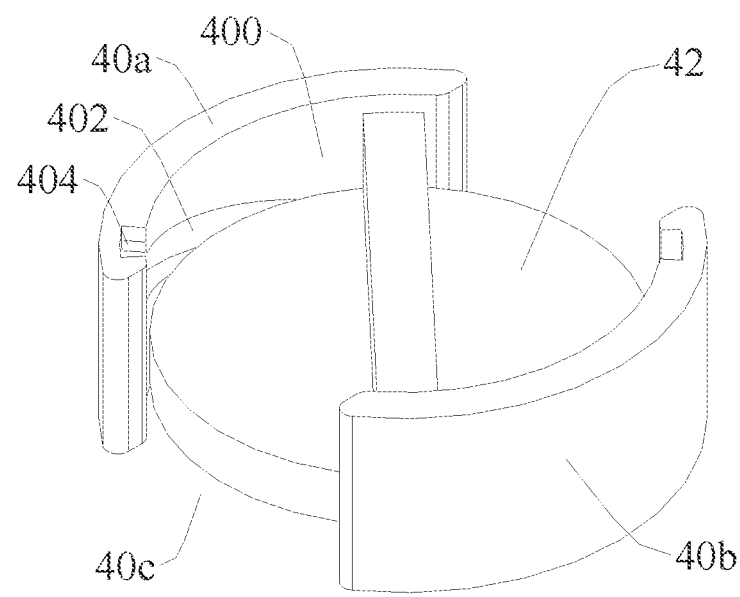
FIG. 6 is a schematic structural diagram of connected status of a fixing component according to an embodiment of this application.

As shown in FIG. 6, a mating slot 402 is disposed on a side wall of the inner cavity 400. The mating slot 402 extends in a circumferential direction of the inner cavity 400 and slants in a radial direction of the inner cavity 400. For example, the mating slot 402 may be configured as a slot-like structure extending spirally or similarly. A rib-like structure that fits with the mating slot 402 is disposed on the rotation portion 42. The rib-like structure extends in a circumferential direction of the rotation portion 42 and slants in a radial direction of the rotation portion 42. The rotation portion 42 is screwed into the fixing portion 40 along the mating slot 402.

In some embodiments, the rotation portion 42 includes a spindle 420. A bulge 422 is disposed on a side wall of the spindle 420. The bulge 422 is configured as a block structure protruding from the spindle 420, which is equivalent to partitioning the rib-like structure into a plurality of discrete block structures. The bulge 422 is screwed into the fixing portion 40 along the mating slot 402, so as to reduce a contact area between the rotation portion 42 and the mating slot 402. This reduces a frictional resistance between the rotation portion and the mating slot, and enables the rotation portion 42 to be screwed into the fixing portion 40 more easily. In some embodiments, the bulge 422 is configured as a cylindrical structure protruding from the spindle 420. In this way, the bulge 422 contacts the mating slot 402 linearly, and the contact area between the rotation portion 42 and the mating slot 402 is further reduced.

In some embodiments, the bulges 422 are two in number. The two bulges 422 are symmetrically disposed on two sides of the spindle 420. Correspondingly, the mating slot 402 also includes two mating slot sections 402*a*, and the two mating slot sections 402*a* are disposed centrosymmetrically. Therefore, the two bulges 422 are screwed into the mating slot 402 from two sides along the corresponding mating slot sections 402*a* respectively. In this way, the rotation portion 42 can be screwed into the fixing portion more steadily, tilting is avoided in the process of screwing the rotation portion 42 into the fixing portion 40, and a steady and even pressing force is exerted by the rotation portion 42 on the temperature sensor 5. Understandably, merely one or more bulges 422 may be disposed on the rotation portion 42. Correspondingly, the mating slot 402 may include one or more mating slot sections 402*a*, so that the quantity of the mating slot sections 402*a* matches the quantity of the bulges 422.

In some embodiments, a notch 406 is disposed on an inner side wall of the mating slot 402. The notch 406 extends in a direction away from the battery cell 1. To be specific, the notch 406 is disposed on a side wall of the mating slot 402 and is recessed in the side wall of the mating slot 402, where the side wall is on a side away from the battery cell 1. When the rotation portion 42 presses the temperature sensor 5 tightly, the bulge 422 is located in the notch 406. To be specific, as the rotation portion 42 rotates, the bulge 422 slides along the mating slot 402. In this way, the rotation portion 42 moves in a direction closer to the battery cell 1 and presses the temperature sensor 5 tightly, so as to accumulate a specific amount of elastic deformation between the rotation portion 42 and the battery cell 1. When the bulge 422 slides to the notch 406, the elastic deformation is partially recovered, thereby making the rotation portion 42 slightly move in a direction away from the battery cell 1. In this way, the bulge 422 is snap-fitted into the notch 406 to prevent the rotation portion 42 from automatically reversely rotating during operation under an impact such as vibration, prevent the rotation portion 42 from loosening, and improve the reliability of connection between the temperature sensor 5 and the battery cell 1.

Merely one notch 406 may be disposed on the inner side wall of the mating slot 402. In this case, the notch 406 needs to be disposed at an end of the mating slot 402, the end being close to the battery cell 1. In this way, when the bulge 422 is screwed into an end of the notch 406, where the end is close to the battery cell 1, the rotation portion 42 presses the temperature sensor 5 tightly to improve a utilization rate of the mating slot 402. Alternatively, a plurality of notches 406 may be disposed on the inner side wall of the mating slot 402. The plurality of notches 406 are arranged sequentially in an extension direction of the mating slot 402. In this way, the rotation portion 42 can be fixed to a plurality of positions in the mating slot 402, and the fixing component 4 is applicable to temperature sensors 5 of various specifications.

In some embodiments, a positioning aperture 404 is disposed on the mating slot 402. The positioning aperture 404 is disposed at an end of the mating slot 402, the end being away from the battery cell 1. The positioning aperture 404 extends to the outside of the fixing portion 40. The rotation position 42 slides into the mating slot 402 along the positioning aperture 404. Therefore, the rotation portion 42 and the fixing portion 40 can be positioned accurately, and the rotation portion 42 can be mounted more conveniently. Understandably, the positioning aperture 404 may be omitted on the mating slot 402, and an end of the mating slot 402, which is away from the battery cell 1, is directly extended to the outside of the fixing portion 40, so that the rotation portion 42 is directly fitted with the mating slot 402 at the outside of the fixing portion 40.

In some embodiments, along an axial direction of the fixing portion 40, the positioning aperture 404 extends to an end of the fixing portion 40, the end being away from the battery cell 1. In this way, the rotation portion 42 slides from the positioning aperture 404 into the mating slot 402 along a vertical direction (a direction parallel to an axis of the fixing portion 40). The rotation portion 42 can be automatically slid into the mating slot 402 under the action of its own gravity, friction between the rotation portion 42 and the positioning aperture 404 is avoided, and the mounting of the rotation portion 402 is more labor-saving.

A relatively large quantity of parts are disposed at the top of the battery cell 1. Therefore, the space is relatively small and the structures and shapes are complex and diverse at the top of the battery cell 1. Therefore, the fixing portion 40 may include a first fastener 40a and a second fastener 40b. The first fastener 40a and the second fastener 40b define an inner cavity 400. In this way, the structures and shapes of the fixing portion 40 are more flexible and adaptable, and the fixing portion 40 can adapt to the top of the battery cell 1.

Figure 7:
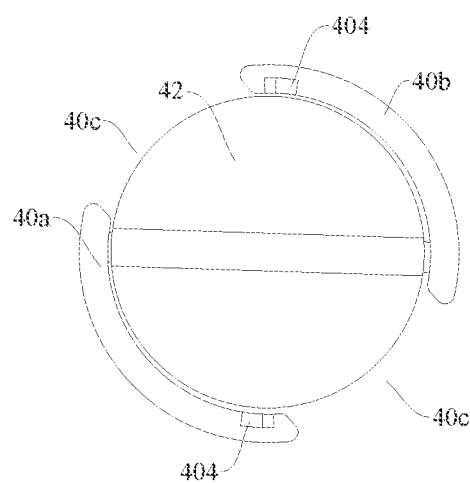
FIG. 7 is a schematic structural top view of FIG. 6.
Figure 8:
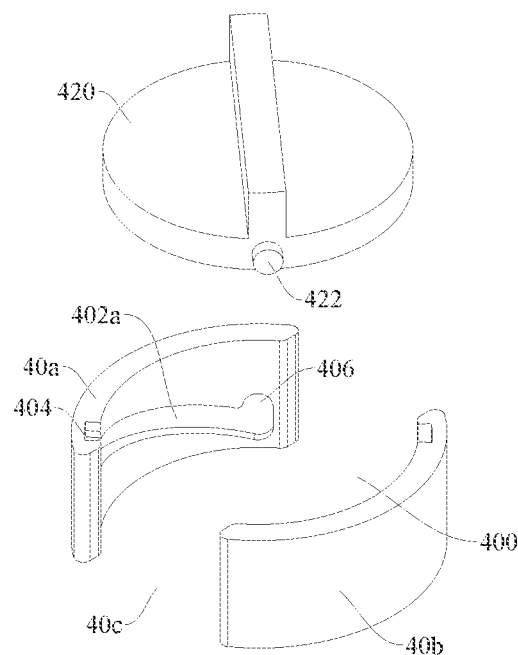
FIG. 8 is a schematic structural diagram of detached status of a fixing component according to an embodiment of this application.

As shown in FIG. 7, a gap 40c is disposed between the first fastener 40a and the second fastener 40b, and a part of the circuit board 2 passes through the gap 40c. The circuit board 2 is avoided through the gap 40c. Therefore, the fixing portion 40 is prevented from obstructing an extension path of the circuit board 2, and the gap can limit the position of the circuit board 2 and prevent the circuit board 2 from moving.

In some embodiments, when the mating slot 402 includes two mating slot sections 402a, the two mating slot sections 402a are disposed on the first fastener 40a and the second fastener 40b respectively. The two mating slot sections 402a are disposed centrosymmetrically. A positioning aperture 404 may be disposed on each of the two mating slot sections 402a. The positioning aperture 404 may be disposed at an end of the mating slot section 402a, the end being away from the battery cell 1. The positioning aperture 404 may extend to the outside of the fixing portion 40 in an axial direction of the fixing portion 40, or, the positioning aperture 404 may extend from the gap 40c to the outside of the fixing portion 40 in a circumferential direction of the fixing portion 40.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application shall fall within the protection scope of this application.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A battery module, comprising:
   a battery cell;
   a circuit board, disposed at a top of the battery cell and electrically connected to the battery cell;
   a temperature sensor, disposed at the top of the battery cell and configured to measure a temperature of the battery cell, wherein the temperature sensor is electrically connected to the circuit board; and
   a fixing component, wherein the fixing component comprises a fixing portion and a rotation portion, the fixing portion is fixed to the top of the battery cell, and the rotation portion is screwed into the fixing portion whereby the temperature sensor is pressed against the battery cell tightly,
   wherein the fixing portion comprises an inner cavity and a mating slot, the inner cavity runs through to the top of the battery cell, the temperature sensor is accommodated in the inner cavity, the mating slot extends in a circumferential direction of the inner cavity and slants in a radial direction of the inner cavity, the mating slot is disposed centrosymmetrically on a side wall of the inner cavity,
   wherein the rotation portion comprises a spindle and two bulges symmetrically disposed on two sides of the spindle, the two bulges protrude from the spindle, and are screwed into the fixing portion along the mating slot,
   wherein the mating slot comprises two mating slot sections, each one of the two mating slot sections has an end away from the battery cell and an end close to the battery cell, two notches are disposed on an inner side wall of the mating slot, each one of the two notches is disposed at the end of one of the two mating slot sections close to the battery cell, each one of the two notches is recessed in the inner side wall of the mating slot, and the two bulges are located in the two notches, respectively.

2. The battery module according to claim 1, wherein a positioning aperture is disposed on each one of the two mating slot sections, the positioning aperture is disposed at the end of each one of the two mating slot sections away from the battery cell, and the positioning aperture extends to an outside of the fixing portion.

3. The battery module according to claim 1, wherein the fixing portion comprises a first fastener and a second fastener, and the first fastener and the second fastener define the inner cavity, the two mating slot sections are respectively disposed on the first fastener and the second fastener.

4. The battery module according to claim 3, wherein a gap is disposed between the first fastener and the second fastener, and a part of the circuit board passes through the gap.

5. The battery module according to claim 1, wherein the battery module further comprises a thermally conductive piece, and the thermally conductive piece is disposed between the temperature sensor and the battery cell.

6. The battery module according to claim 1, wherein the battery module further comprises an elastic gasket, and the elastic gasket is disposed between the rotation portion and the temperature sensor.

7. The battery module according to claim 1, wherein the battery module further comprises a wiring harness separator, the wiring harness separator is fixed to the top of the battery cell, and the fixing portion is disposed on the wiring harness separator.

8. A device, comprising the battery module according to claim 1, wherein the battery module is configured to provide electrical energy.

* * * * *